Oct. 21, 1952  G. C. WYMAN  2,614,724
PRESSURE COOKER WITH SELECTIVELY ADJUSTABLE VENT VALVE
Filed May 13, 1948    5 Sheets-Sheet 5
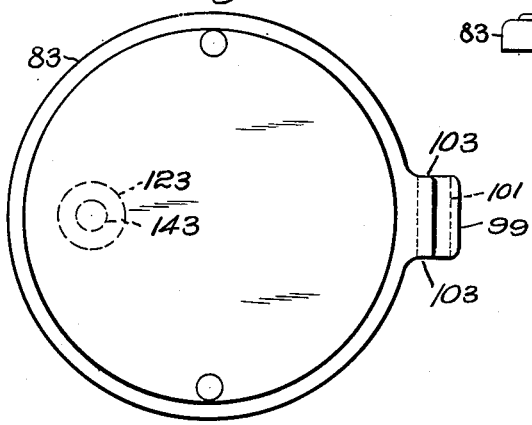
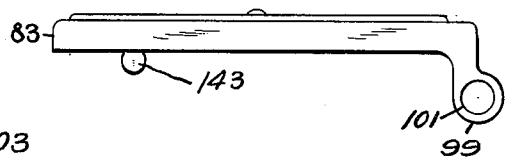
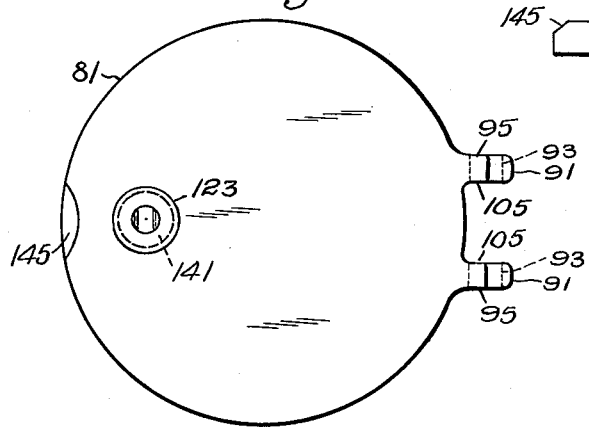
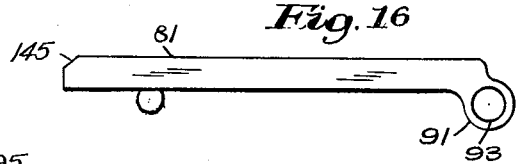
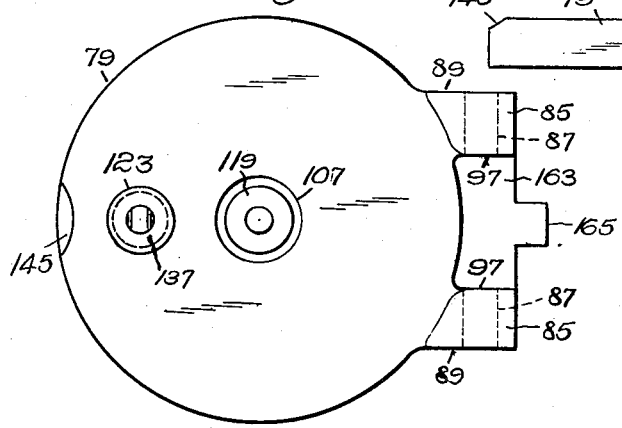
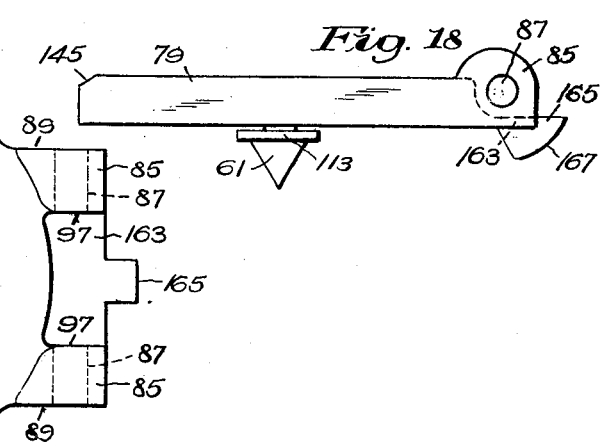
Inventor.
Glenn C. Wyman.
Attys Patented Oct. 21, 1952

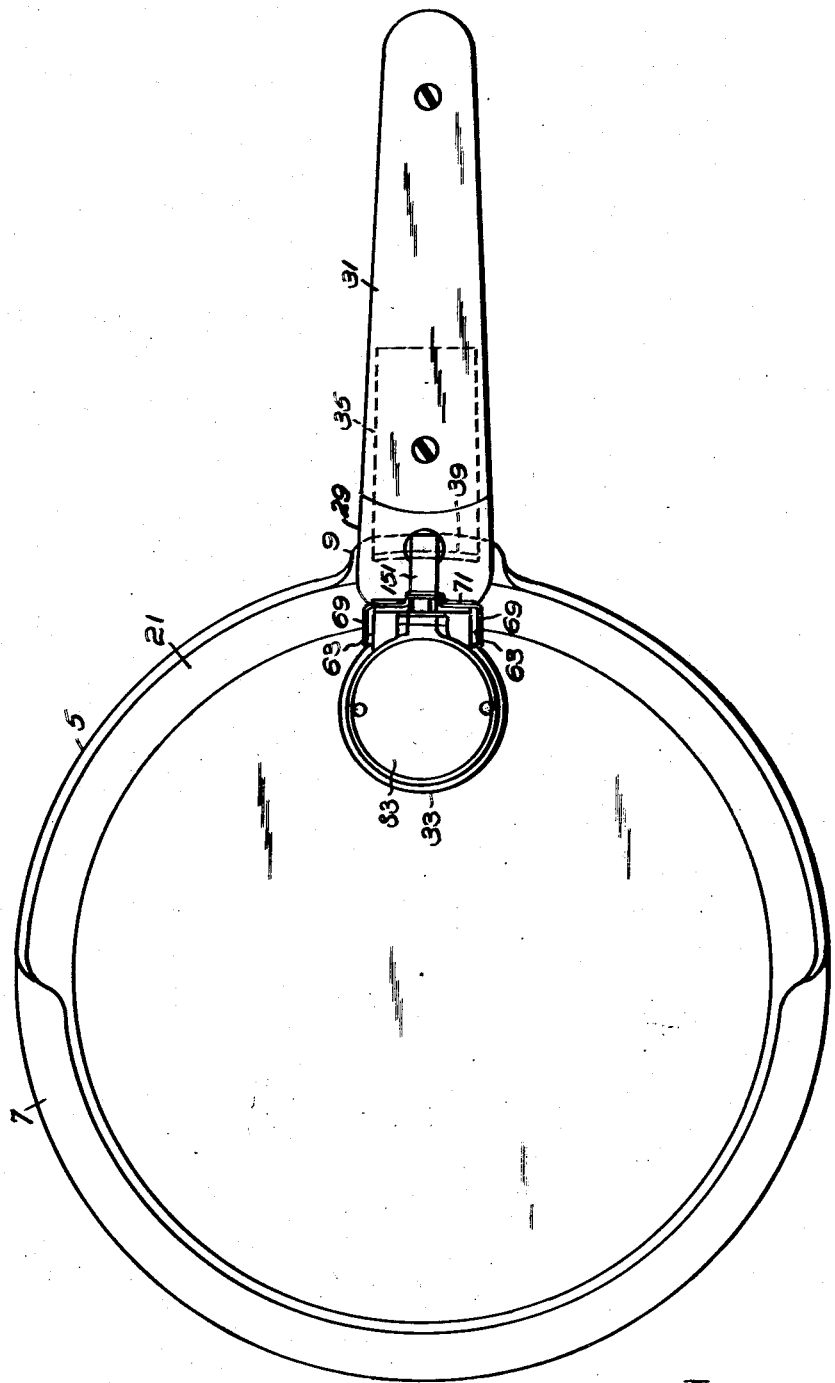

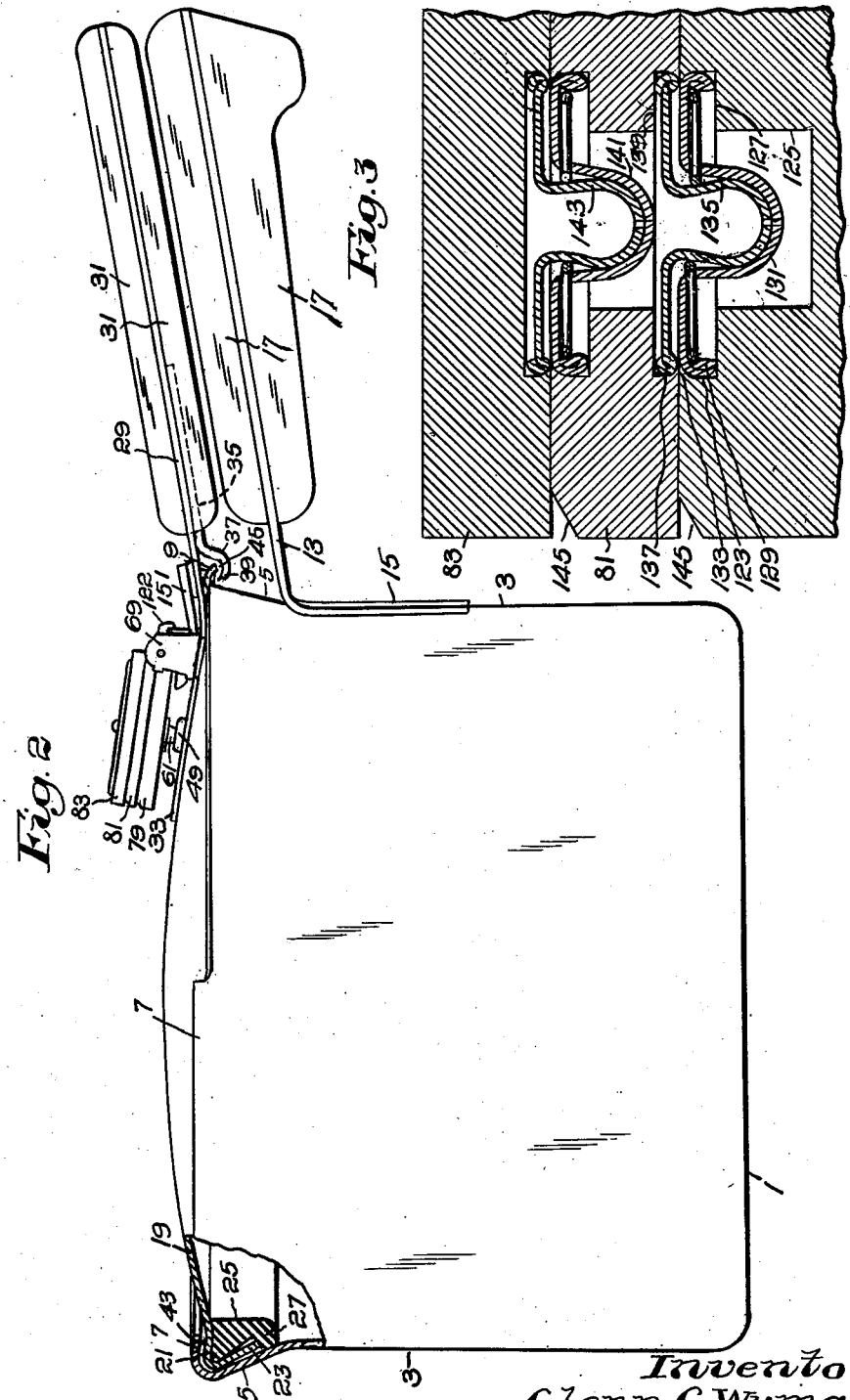

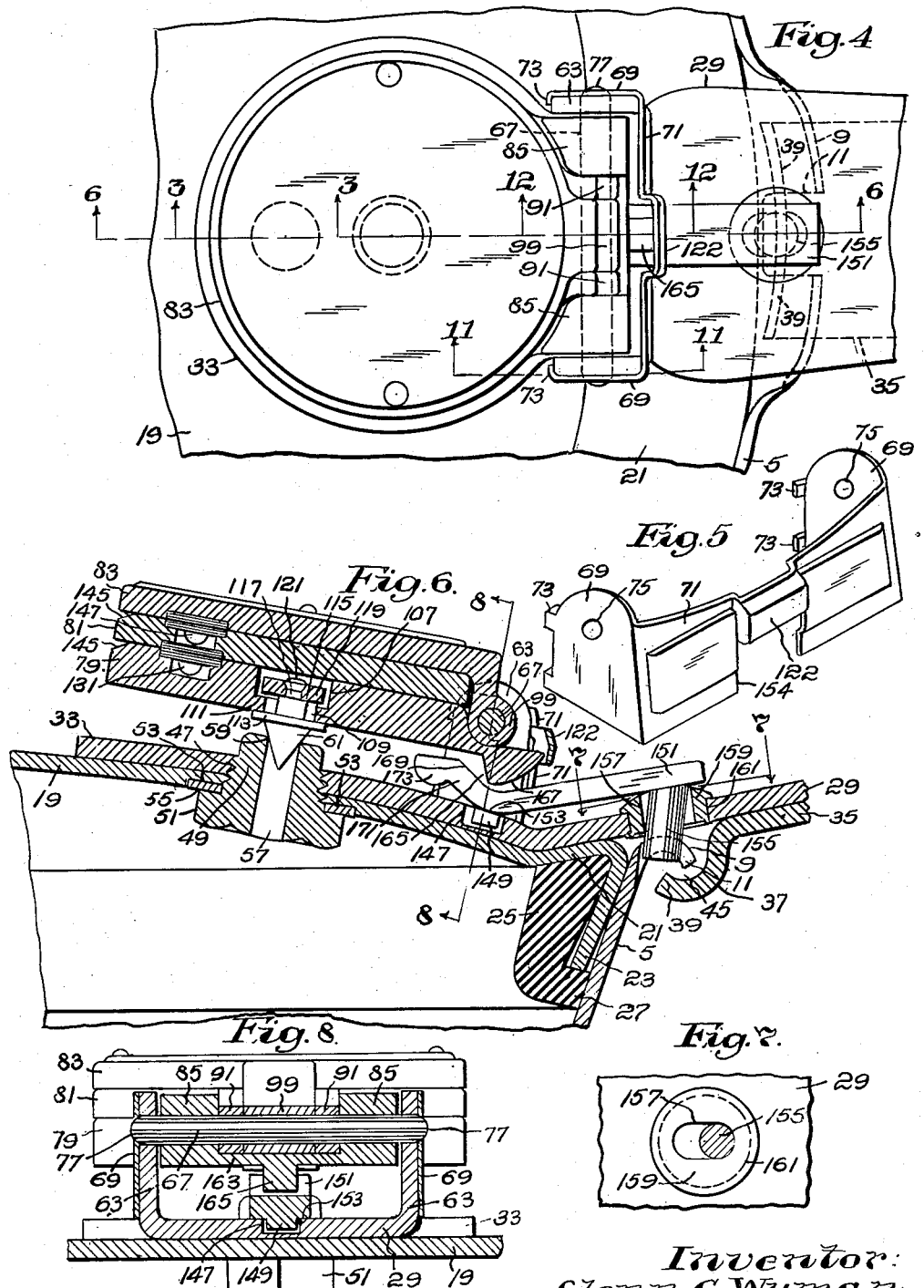

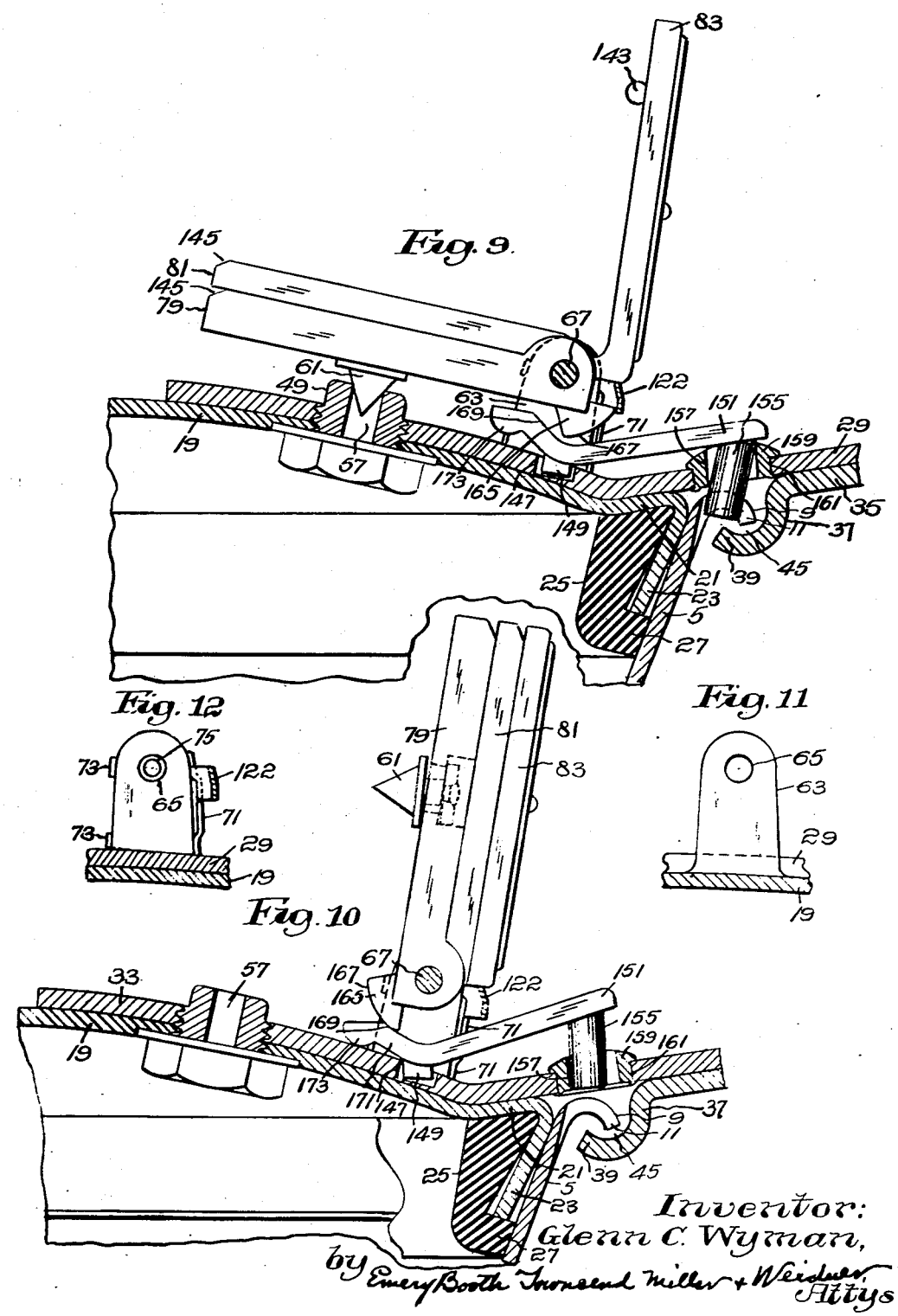

2,614,724

UNITED STATES PATENT OFFICE 2,614,724

PRESSURE COOKER WITH SELECTIVELY ADJUSTABLE VENT VALVE

Glenn C. Wyman, Rome, N. Y., assignor to Revere Copper and Brass Incorporated, Rome, N. Y., a corporation of Maryland Application May 13, 1948, Serial No. 26,862

10 Claims. (Cl. 220—44)

My invention relates to pressure cookers.

The invention has among its objects improved means for controlling the pressure within the pressure cooker and for preventing release of the cover when the cooker is under pressure.

The above and other objects of the invention will be best understood from the following description when read in the light of the accompanying drawings of a specific embodiment of the invention selected for illustrative purposes, while the scope of the invention will be more particularly pointed out in the appended claims.

In the drawings:

Fig. 1 is a plan of a pressure cooker according to the invention;

Fig. 2 is a side elevation of a pressure cooker according to Fig. 1, with parts in section;

Fig. 3 is a section on the line 3—3 of Fig. 4, on an enlarged scale, of a fragment of the weights for controlling the pressure relief valve;

Fig. 4 is a plan of a fragment of Fig. 1, on an enlarged scale;

Fig. 5 is an isometric view of a part employed in the cooker according to the preceding figures;

Fig. 6 is a section on the line 6—6 of Fig. 4;

Fig. 7 is a section on the line 7—7 of Fig. 6 showing a detail;

Fig. 8 is a section on the line 8—8 of Fig. 6;

Figs. 9 and 10 are, respectively, sections corresponding to Fig. 6, with the parts in different operative positions;

Figs. 11 and 12 are, respectively, sections on the lines 11—11 and 12—12 of Fig. 4, with parts omitted;

Fig. 13 is a plan of the upper valve controlling weight of Fig. 6;

Fig. 14 is a side elevation of the weight according to Fig. 6;

Fig. 15 is a plan of the middle valve controlling weight according to Fig. 6;

Fig. 16 is a side elevation of the weight according to Fig. 15;

Fig. 17 is a side elevation of the lower valve controlling weight according to Fig. 6; and Fig. 18 is a side elevation of the weight according to Fig. 17.

The pressure cooker illustrated by the drawings comprises a container, preferably formed of sheet metal such as stainless steel, having a bottom wall 1 and cylindrical side walls 3. Adjacent their upper edges the side walls are formed to present an outwardly flared frusto-conical portion 5 extending entirely about said walls. At its upper edge this frusto-conical portion is formed to present an inwardly turned lip 7 extending about said portion for approximately 180°. At the side of the frusto-conical portion diametrically opposite the lip 7 said portion is formed with an outwardly projecting downwardly turned lip 9 of shorter angular extent than the lip 7. Midway its length the lip 9 is shown as formed with a notch 11 (Figs. 4 and 6). Carried by the container is a radially projecting handle 13 having a base portion 15 secured to the cylindrical wall of the container, preferably by welding, this handle being provided with the handle grips 17.

As shown, the cover, which also is formed of sheet metal, preferably stainless steel, is shaped to present a dome-like central portion 19 surrounded by a flattened relatively narrow annular flange 21. Integral with the outer peripheral edge of this flange is an inwardly turned downwardly extending frusto-conical flange 23 extending entirely about the cover. Carried by the cover at its under side is a gasket ring 25 of greater height than the flange 23, this ring being formed of flexible material, such as synthetic rubber, and being shaped to fit into the space between the flanges 21 and 23 and to provide a lower portion 27 which projects radially beyond the outer side of the flange 23 at its lower edge so as to bear uninterruptedly against the inner wall of the frusto-conical portion 5 of the container when the cover is assembled with the latter.

As shown, the cover is provided with a radially projecting handle 29 provided with the handle grips 31. This handle is provided with a base portion 33 which and the adjacent portion of the handle conform to the upper sides of the dome-shaped portion 19 and annular flange 21 of the cover to which they are secured preferably by welding. Secured to the under side of the handle 29, preferably by welding, is the base 35 of a strip-like member which, at its end adjacent the cover, is provided with a downturned portion 37, which latter, at its lower end, is upwardly turned to form a hook 39.

When the parts are in the position shown by the drawings the cover is retained on the container by the container lip 7 positioned above the cover flange 21 and by the container lip 9 positioned above the cover hook 39. When the cover is initially placed on the container a clearance 43 exists between the container lip 7 and cover flange 21, and an equal clearance 45 between the container lip 9 and cover hook 39, the projecting portion 27 of the gasket ring 25 bearing against the frusto-conical container portion 5 so as to seal the joint between the cover and container and thus permit pressure to build up in the cooker. When the pressure builds up the cover rises to take up the clearances 43 and 45, the gasket due to its resiliency and the pressure in the cooker remaining in contact with the frusto-conical container portion 5 so that at all times the gasket renders the joint between the cover and the container steam-tight.

As shown, the base portion 33 of the handle and cover portion 19 immediately below it are formed with a screw-threaded perforation 47 (Fig. 6) in which is received the screw-threaded shank 49 of a metal screw plug having a head 51 at the under side of the cover. As shown, the portion of the under side of the cover surrounding the perforation 47 is recessed at 53 to receive a resilient annular gasket washer 55 interposed between the bottom of said recess and the adjacent side of the head 51 for rendering the joint between the plug and the cover fluid-tight. As shown, the plug is formed with a through passage 57 forming a vent for the cooker. The upper peripheral edge 59 of this passage cooperates with a frusto-conical valve 61 for controlling such vent.

As shown, the cover handle 29 adjacent the base portion 33 thereof at each of its opposite sides is provided with an upstanding ear 63, each of these ears having a perforation 65 (Fig. 12). Supported by these ears is a pin 67 the opposite end portions of which are received in the perforations of the ears. For retaining the pin in the ears is provided a removable spring clip, best shown by Figs. 4, 5 and 12. This clip, which is formed of resilient sheet metal, comprises opposite end-pieces 69, of approximately the same shape as the ears, connected at one of their vertical edges by a bridge-piece 71 integral therewith, the vertical edges of each end-piece opposite the bridge-piece being provided with spaced tabs 73 projecting toward the other ear. Each end-piece is shown as provided with a perforation 75 of slightly smaller diameter than the perforation 65 in the ear, as clearly indicated in Fig. 12. The clip is applied to the ears by forcing it over them so that the end-pieces lie at the outer sides of the ears with the adjacent portions of the bridge-piece 71 and the tabs 73 engaging the opposite vertical edges of the ears, respectively. The pin is provided with rounded ends 77 projecting beyond the outer surfaces of the end-pieces 69 of the clip so that when the clip is forced over the ears the end-pieces will resiliently bend to cause these rounded ends of the pin to snap into the perforations 75 of the end-pieces, as clearly shown in Figs. 4 and 8. In this way the pin holds the clip against removal from the ears, while the clip holds the pin in the perforations of the ears. By removing the clip, which may be readily done because of its resiliency, the pin may be slid longitudinally for removing it from the ears.

Swingingly mounted on the pin 67 are a plurality of weights for controlling the vent valve 61. As shown, three of these weights are provided, a lower weight 79, an intermediate weight 81, and an upper weight 83. As best illustrated by Figs. 4, 6, 8, and 13 to 18, these weights are in the form of flat disks. The lower weight 79, as shown, is provided at one peripheral side thereof with a pair of spaced laterally projecting upwardly extending lugs 85 each of which is provided with a perforation 87 through which the pin 67 extends, the outer sides 89 of these lugs being in closely adjacent relation to the opposite sides of the ears 63 so as to minimize any lost motion of the weight longitudinally of the pin. The intermediate weight 81, as shown, is provided at one peripheral side thereof with a pair of spaced laterally projecting downwardly extending lugs 91 each of which is provided with a perforation 93 through which the pin 67 extends. These lugs 91 are received between the lugs 85 of the lower weight 79, the outer sides 95 of the lugs 91 being in closely adjacent relation to the inner sides 97 of the lugs 85 of the lower weight 79. The upper weight 83 is shown as provided at one peripheral side thereof with a laterally projecting downwardly extending lug 99 provided with a perforation 101 through which the pin 67 extends, the outer sides 103 of the lug 99 being in closely adjacent relation to the inner sides 105 of the lugs 91 of the intermediate weight 81.

As best shown in Figs. 6 and 17, the lower weight 79 is provided with an axial through opening 107 formed adjacent the under side of the weight with a reduced diameter portion 109 so as to provide an upwardly facing shoulder 111. The frusto-conical portion of the vent valve 61 at its base is formed with an annular flange 113 adapted, when the parts are in the position shown by Fig. 6, to rest on the under surface portion of the weight surrounding the reduced diameter portion 109 of the opening in the latter. Rearwardly of the flange 113 the valve has a shank 115 extending into the reduced diameter portion 109 of the opening in the weight. This shank at its rearward end has a reduced diameter portion 117 which carries an annular metal washer 119. This washer seats on the shoulder between the reduced diameter portion 117 of the shank and the body of the shank, and is secured to the reduced diameter portion by riveting over the projecting end of that portion as indicated at 121. The body of the shank is of such length that, when the parts are in the position shown by Fig. 6, the washer is spaced from the shoulder 111 of the opening in the weight, while the diameter of the reduced diameter portion 109 of the opening is greater than that of the shank. This construction permits the valve to slide laterally and to tilt relative to the weight 79 so as to compensate for lost motion of the pivotal support for the weight and discrepancies in manufacture, and thus insures the frusto-conical surface of the valve properly seating on the peripheral edge 59 of the vent passage 57.

It will be observed that the weight 79 exerts a downward force tending to hold the valve 61 on its seat, and that the weights 81 and 83, in the position of parts shown by Fig. 6, augment such downward force. If it is desired to decrease the force by which the valve is forced downward the upper weight 83 may be moved to the position shown by Fig. 9, and if it is desired still further to decrease that force the intermediate weight may be moved to a similar position, while if it is desired entirely to vent the cooker all the weights may be moved to the position shown by Fig. 10. In this way the cooker may be operated under any of three selected pressures, say 5 pounds per square inch, 10 pounds per square inch, and 15 pounds per square inch. The weight 83, when swung to its upward position shown by Fig. 9, is shown as supported by the upper edge of the laterally projecting portion 122 of the bridge-piece 71 of the clip which removably holds the pin 67 in place. Successive weights when raised to their upper position rest against the weight 83, and hence are also supported by the bridge-piece. The parts, as shown, are so proportioned that, when the weights are swung to their upper positions, the center of gravity of each of them is at the side of the pin 67 opposite the cover vent passage 57.

As shown, the several weights are preferably provided with means for readily detachably securing them together to facilitate their manipulation by the operator. To this end the weight 79 at its upper side is shown as formed with a recess 123 (Fig. 3) having a reduced diameter portion 125 so as to provide an upwardly facing shoulder 127. Within this recess is received the flange portion 129 of the socket part 131 of a snap fastener of common construction, this flange resting against the shoulder 127 and being secured in the recess by beading over the material of the weight at the outer peripheral edge of the recess as indicated at 133. The snap fastener stud part 135, which coooperates with the socket part 131 of the fastener, is carried by the weight 81, the flange portion 137 of this stud part being received in a recess 139 at the under side of the weight 81, in which recess it is secured in the same manner as the socket part of the fastener. In a similar way the upper side of the weight 81 is provided with a socket part 141 of a second and like snap fastener, and the under side of the weight 83 with a fastener stud part 143 cooperating with said socket part, as will be clear from Fig. 3. The peripheral portions of the weights 79 and 81 opposite their pivotal support are shown as provided with notches 145 (Figs. 3, 6, and 15 to 18) for facilitating engaging the weights 83 and 81 for pulling the stud parts of the snap fasteners carried by those weights out of the cooperating socket parts of the snap fasteners carried by the weight immediately below each of them.

As illustrated, the portion of the cover handle base 33 between the ears 63 is formed on its upper side with a cylindrical recess 147 (Figs. 6 and 8) which loosely receives a cylindrical lug 149 formed integrally with and projecting downwardly from the apex portion of a bent or angle lever 151, the convex portions 153 of this lever at opposite sides of the lug 149 swinging or rockably resting on the upper surface of the base portion 33 of the cover handle. The lever extends radially outwardly of the cover through a notch 154 formed in the bridge-piece 71 of the clip which retains the pivot pin 67 in position, this notch being formed in the portion of the bridge-piece below the projection 122 thereof, as clearly shown in Fig. 5. At its outer end the lever 151 intermediate its width carries a downwardly projecting locking pin 155. This pin projects downwardly through and fits the opposite lateral sides of an elongated slot-like opening 157 (Figs. 6 and 7) formed in a bushing 159, this bushing being fixedly secured in a through opening 161 formed in the cover handle 29. When the parts are in the position shown by Fig. 6 the lower end of the pin 155 is received in the notch 11 in the lip 9 of the container, and is of sufficient length to be still received in such notch when the cover rises because of pressure within the cooker to take up the clearances 43 and 45. Hence, when the parts are in the position shown by Fig. 6, the cover is prevented from being rotated relative to the container for releasing the cover therefrom.

As shown, the lower weight 79 is provided with a web 163 (Figs. 8, 17 and 18) integral with the lower portions of the lugs 85 of that weight and the portion of its peripheral edge between them. This web carries a projecting lug or cam 165 having a curved cam surface 167. This cam surface is adapted to cooperate with the upper surface 169 of the tail-piece 171 of the rockable locking lever 151 for raising the locking pin 155 out of the notch 11 in the container lip 9 when the lower weight 79 is swung from its position shown by Fig. 6 to its position shown by Fig. 10. When the lower weight is so swung the cooker is vented to relieve the pressure therein, under which conditions the cover may be rotated relative to the container to release it therefrom. Preferably, the tail-piece 171 of the lever 151 is provided at the under side of its free end with a downwardly extending projection 173 which is in contacting or closely adjacent relation with the upper surface of the base 33 of the cover handle when the parts are in the position shown by Fig. 10 so as to retain the lever in assembled relation with the other parts when the lower weight is in that position, the cam lug 165 and pin 155 being so proportioned as to retain the lever in assembled relation with the other parts when the weight is in the position shown by Fig. 6.

In operating the cooker, after the container is charged with food to be cooked the cover may be placed on the container and secured thereto with all the weights in their raised positions shown by Fig. 10. The cover is applied to the container, for securing it thereto, with the cover handle 29 out of vertical alignment with the container handle 13 and inclined slightly upward to such an extent that the edge portion of the cover opposite its handle may be inserted under the lip 7 of the container. The handle 29 may then be lowered to cause the radially outwardly projecting portion 27 of the gasket ring to seat on the frusto-conical portion 5 of the container throughout the angular extent of such ring, whereupon the handle 29 may be swung to bring it into vertical alignment with the handle 13 of the container for placing the hook 39 of the cover under the lip 9 of the container. This will place the pin 155 in vertical alignment with the notch 11 in the lip 9 of the container, so that when the lower weight is moved by the operator from its position shown by Fig. 10 to that shown by Fig. 6 the lever 151 will be permitted to swing downward by gravity to cause the pin 155 to enter the notch for preventing release of the cover until the weights are again swung to their positions shown by Fig. 10. It will be observed that the tilting of the cover to insert its edge under the container lip 7 is in such direction that the weights will be maintained in their upper positions so that they will not fall and act to cause the locking pin 155 to interfere with the necessary step of rotating the cover to place its handle in vertical alignment with the container handle.

It will be understood that within the scope of the appended claims wide deviations may be made from the form of the invention described without departing from the spirit of the invention.

I claim:

1. A portable pressure cooker comprising a container and a cover therefor, each having a handle projecting radially therefrom, means for locking the cover to the container enforcing positioning of the grip portions of such two handles in closely adjacent superimposed relation for causing them to act conjointly as a single handle grip for the cooker, the cover having a vent opening, vent controlling means for said opening comprising a vent valve adapted to be urged toward open position by pressure of the fluid to be vented and a vent controlling weight for urging said valve toward closed position in opposition to such pressure, one or more auxiliary vent controlling weights adapted to be supported by the first mentioned weight for augmenting the valve closing force exerted by the latter, each of said weights being operatively mounted on said cover for swinging about a horizontal axis laterally spaced from said opening for selective manual movement to its vent controlling position, in which position the center of gravity of the weight is at the same side of its axis of swinging as said opening, or to a position in which its center of gravity is at the opposite side of said axis and the weight thus maintained out of vent controlling position, whereby the first mentioned weight may be caused exclusively to control escape of fluid through said opening or that weight and one or more of said auxiliary weights may be caused to control it or such escape may be caused to be uncontrolled by any of said weights, said vent opening being positioned adjacent the base of the cover handle, said horizontal axis of swinging of each weight being transverse to and intersecting the vertical plane which includes the longitudinal axial line of the grip portion of the cover handle and being positioned between the vent opening and such grip portion, the first mentioned weight having an under side of enlarged area which when said weight controls said valve is positioned above said vent opening to act as a shield against upwardly directed steam from said vent opening, each weight being swingable about its said axis of swinging toward and away from said grip portion of said cover handle for securing the selected positions of arrangement of said weights, the swinging movement of the first mentioned weight when swung toward said last mentioned grip portion being limited to a position in which said under side of that weight is directed upwardly and interposed between said vent opening and such grip portion so as to act to shield the latter against steam escaping from said vent opening.

2. A portable pressure cooker comprising a container and a cover therefor, each having a handle projecting radially therefrom, means for locking the cover to the container enforcing positioning of the grip portions of such two handles in closely adjacent superimposed relation for causing them to act conjointly as a single handle grip for the cooker, the cover having a vent opening, vent controlling means for said opening comprising a vent valve adapted to be urged toward open position by pressure of the fluid to be vented and a vent controlling weight for urging said valve toward closed position in opposition to such pressure, one or more auxiliary vent controlling weights adapted to be supported by the first mentioned weight for augmenting the valve closing force exerted by the latter, each of said weights being operatively mounted on said cover for swinging about a common horizontal axis laterally spaced from said opening and being manually movable about said axis selectively to its vent controlling position, in which position the center of gravity of the weight is at the same side of said axis as said opening, or to a position in which its center of gravity is at the opposite side of said axis and the weight thus maintained out of vent controlling position, whereby the first mentioned weight may be caused exclusively to control escape of fluid through said opening or that weight and one or more of said auxiliary weights may be caused to control it or such escape may be caused to be uncontrolled by any of said weights, said vent opening being positioned adjacent the base of the cover handle, said horizontal axis of swinging of each weight being transverse to and intersecting the vertical plane which includes the longitudinal axial line of the grip portion of the cover handle and being positioned between the vent opening and such grip portion, the first mentioned weight having an under side of enlarged area which when said weight controls said valve is positioned above said vent opening to act as a shield against upwardly directed steam from said vent opening, each weight being swingable about its said axis of swinging toward and away from said grip portion of said cover handle for securing the selected positions of arrangement of said weights, the swinging movement of the first mentioned weight when swung toward said last mentioned grip portion being limited to a position in which said under side of that weight is directed upwardly and interposed between said vent opening and such grip portion so as to act to shield the latter against steam escaping from said vent opening.

3. The combination according to claim 1 in which the valve is carried by the first mentioned weight of that claim.

4. The combination according to claim 2 in which the valve is carried by the first mentioned weight of that claim.

5. A portable pressure cooker comprising a container and a cover therefor, each having a handle projecting radially therefrom, means for locking the cover to the container enforcing positioning of the grip portions of such two handles in closely adjacent superimposed relation for causing them to act conjointly as a single handle grip for the cooker, the cover having a vent opening, means for controlling said opening comprising a valve adapted to be urged toward open position by pressure of the fluid to be vented and a weight for urging said valve toward closed position in opposition to such pressure, which weight carries said valve, one or more independently movable auxiliary weights for controlling said opening adapted to be supported by the first mentioned weight in superimposed relation thereto for augmenting the valve closing force exerted by said first mentioned weight; means mounting said weights on the cover for swinging, each about a horizontal axis laterally spaced from said opening, into selected positions of arrangement in which one or more of said auxiliary weights are unsupported by said first mentioned weight and the latter is operative to control said opening or in which all of said weights are inoperative to control said opening, said vent opening being positioned adjacent the base of the cover handle, said horizontal axis of swinging of each weight being transverse to and intersecting the vertical plane which includes the longitudinal axial line of the grip portion of the cover handle and being positioned between the vent opening and such grip portion, the first mentioned weight having an under side of enlarged area which when said weight controls said valve is positioned above said vent opening to act as a shield against upwardly directed steam from said vent opening, each weight being swingable about its said axis of swinging toward and away from said grip portion of said cover handle for securing the selected positions of arrangement of said weights, the swinging movement of the first mentioned weight when swung toward said last mentioned grip portion being limited to a position in which said under side of that weight is directed upwardly and interposed between said vent opening and such grip portion so as to act to shield the latter against steam escaping from said vent opening.

6. The combination according to claim 5 in which the mounting means for the weights has a common horizontal axis laterally spaced from the vent opening.

7. The combination with a body having a vent opening of means for controlling said opening comprising a valve adapted to be urged toward open position by pressure of the fluid to be vented and a weight for urging said valve toward closed position in opposition to such pressure, one or more auxiliary weights adapted to be supported by the first mentioned weight for augmenting the valve closing force exerted by the latter, means mounting said weights for independent swinging, each about a horizontal axis spaced from said opening, and readily engageable and weights to each other whereby to facilitate swinging them as a unit.

8. A pressure cooker having a container portion and a cover therefor, the latter being provided with a vent opening, a valve for controlling said opening, a weight for urging said valve toward closed position, which weight overlies said vent opening in relatively closely spaced relation thereto, one or more auxiliary weights adapted to be supported on the first mentioned weight for augmenting its closing force on said valve, a laterally projecting handle for said cover, each of said weights being mounted for swinging about a horizontal axis at one side of said opening adjacent the base of said handle, an upwardly projecting shield positioned between said axis and handle for protecting said handle from steam escaping from said opening to the space between the cover and the first mentioned weight, said weights being adapted to be swung about said axis to a position in which they are inoperative to control escape of steam through said opening, in which position they project upwardly from said axis and rest against and are supported by said shield.

9. A pressure cooker having a container portion and a cover therefor, the latter being provided with a vent opening, means for securing said cover to said container portion operated into engaged and released positions by relative rotation of the two, releasable lock for preventing such relative rotation when the cover is so secured, a valve for controlling said opening, a weight for urging said valve toward closed position, one or more auxiliary weights adapted to be supported on the first mentioned weight for augmenting its closing force on said valve, said weights being mounted on the cover for swinging about a horizontal axis at one side of said opening whereby said weights may be severally tilted into a position in which they are inoperative to control escape of vapor through said opening, and means operated only by the first mentioned weight for actuating said lock into released position when that weight is so tilted.

10. The combination according to claim 1 in which the valve is carried by the first mentioned weight of claim 1 and comprises a free end portion of circular transverse cross-section tapered toward its outer end, which tapered free end portion is adapted to enter the vent opening and laterally coact with the walls of said opening for closing said opening, said valve and said weight having cooperating portions for securing said valve to said weight providing a lost motion connection between them permitting the valve to slide laterally relative to said weight.

GLENN C. WYMAN.

REFERENCES CITED

The following references are of record in the file of this patent:

UNITED STATES PATENTS

| Number | Name | Date |
|---|---|---|
| 393,748 | Dixon | Dec. 4, 1888 |
| 708,527 | Calder | Sept. 9, 1902 |
| 835,056 | Calder | Nov. 6, 1906 |
| 1,508,696 | Jacobs | Sept. 16, 1924 |
| 1,585,512 | Roades | May 18, 1926 |
| 2,200,903 | Stephens | May 14, 1940 |
| 2,428,483 | Wittenberg | Oct. 7, 1947 |
| 2,436,566 | Goldberg | Feb. 24, 1948 |